June 7, 1938.  C. KELLER  2,119,817

HIGH TEMPERATURE GAS HEATER

Filed Sept. 21, 1937

Inventor
Curt Keller

Dodge and Son
Attorneys

Patented June 7, 1938

2,119,817

UNITED STATES PATENT OFFICE 2,119,817

HIGH TEMPERATURE GAS HEATER

Curt Keller, Zurich, Switzerland, assignor to Aktiengesellschaft fuer Technische Studien, Zurich, Switzerland, a corporation of Switzerland Application September 21, 1937, Serial No. 164,955
In Switzerland October 12, 1936

10 Claims. (Cl. 126—109)

This invention relates to a tubular gas heater for attaining high gas temperatures.

One field of use for devices of this character is as a component of thermal power plants in which a gaseous working medium, for example, air, describes a closed circuit through a heater such as herein described, expands with the development of external work in at least one turbine and is thereafter compressed in at least one turbo-compressor. In a device of this type it is necessary to heat the air to quite high temperatures, for example, temperatures of the order of 500° C. This relatively high temperature introduces serious practical difficulties. For example, if air is to be heated in its passage through tubes, by means of flue gases flowing over the exterior of the tubes, the use of high heat resistant material is essential. If efficiency considerations preclude the use of artificial cooling of the structural elements or limit such cooling to small amounts, the requirements are very severe.

At about 500° C. the permissible loading of steel and other structural material diminishes very rapidly, with the result that in conventional structures the parts become quite massive, a fact which further contributes to the stresses which must be sustained. The use of massive constructions to sustain the banks of tubes, insulating material, and other components, results in excessive construction costs, and impairs the economical performance of the entire installation.

A further difficulty encountered in the construction of high temperature gas heaters, flows from the great temperature differences and consequent differential expansion as between different parts of the device. These are particularly pronounced at the commencement of the heating period but also occur under normal working conditions, as an incident to load fluctuations.

If the heater is constructed with a central furnace chamber the interior of said chamber is at a very high temperature, while the enclosing or outer parts are less highly heated. The differential expansion which is inherent in such a situation gives rise to severe stresses, increasing the load on some parts beyond safe limits.

In a gas heater the conditions are much more severe than in a steam generator. In media capable of forming drops, for example, water, the heat transmission is much better than in the case of a gas. In a boiler the water or steam cools the heated parts and lowers the temperature accordingly.

The present invention meets the above requirements and provides a tubular heater for air or other gases, which is heated to high temperatures by the combustion of a gas, and which is economical to construct because the structural materials are used efficiently.

This heater has a series of tubes arranged around the central furnace and the flue gas chamber. Each tube is in the form of a sinuous coil having a plurality of vertical runs connected by 180° bends. Each coil lies in a radial plane with respect to the furnace chamber, the various vertical runs being sustained at their upper ends in a supporting plate of fire resistant material. Such supporting plate is freely suspended from an outside sustaining frame by means of tie rods. In such a heater, the tube coils, which are to all intents and purposes, supported only at their upper ends by the supporting plate, above mentioned, are free to expand downwardly, with the result that such expansion of the tubes takes place without the development of stress. Consequently the supporting plate carries simply the weight of the tubes.

The tie rods which connect the supporting plate with the outer sustaining frame are stressed in tension only. All of these parts or components require a comparatively small quantity of structural material and have to transmit slight bending stresses, if any at all. The sustaining frame, which is outside the range of high temperature, and consequently comparatively cool, carries all of the inner parts. It need not be made of expensive material, a fact which is a source of substantial economy. From the above it results that the use of expensive heat resistant supporting material is reduced to the practicable minimum. These advantages are attainable in a marked degree if the tie rods are suitably united with the outer sustaining frame and if the shell plates and insulation which enclose the furnace chamber are not carried by the upper plate.

A preferred embodiment of the invention will now be described in connection with the accompanying drawing which shows, by way of example, a simple embodiment of the invention.

Figure 1:
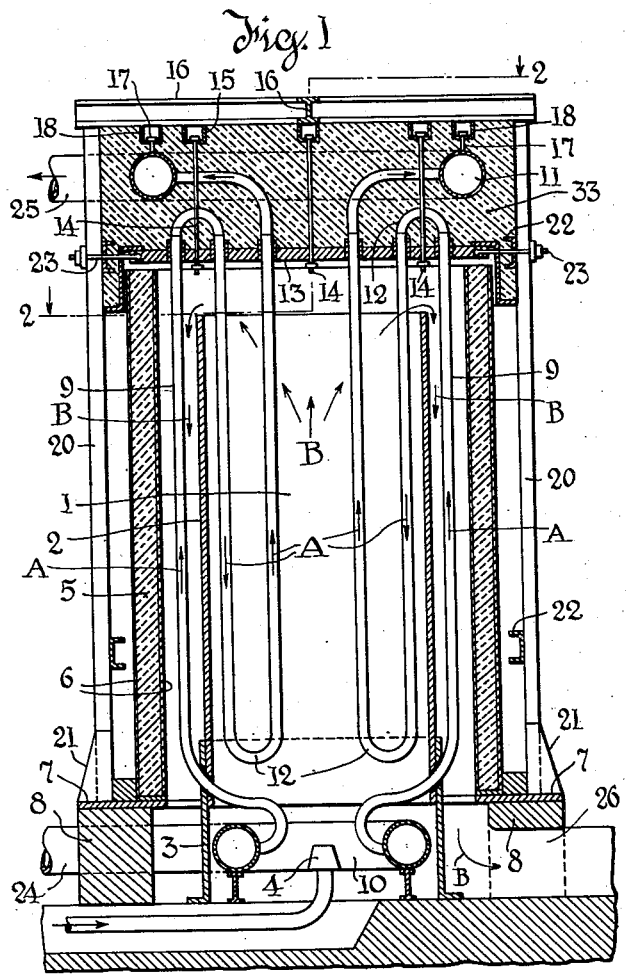
Fig. 1 is a vertical axial section through the gas heater, the plane of section being indicated by the line 1—1 on Fig. 2.

The gas heater has a central furnace and flue gas chamber 1, in which is fitted a cylindrical metal baffle 2 sustained by a cylindrical base 3. The burner 4 is mounted in the lower part of the chamber 1 and the products of combustion flow upward within the baffle 2 and then downward outside this baffle to an offtake 26.

A cylindrical shell 5 of insulating material encloses the furnace chamber and encircles and is spaced from the baffle 2. The insulation 5 may comprise slag wool, aluminum foil, spun glass or the like confined between inner and outer shell plates 6.

The cylindrical enclosure made up of the shells 6 and the intervening insulation 5 rests upon a supporting plate 7 which is carried by the base ring 8 of the heater.

Mounted in the furnace chamber are a plurality of flat coils radially arranged. Each coil is made up of a tube 9 with vertical runs produced by bending the tubes 180° upon themselves so as to produce spaced parallel runs, as shown. The 180° bends or "return bends" are indicated at 12, and in the embodiment illustrated there are two vertical runs inside and one vertical run outside the baffle 2. The precise number of runs and their distribution between the spaces inside and outside the baffle are matters of design and are subject to variation.

The various coils are connected to the lower supply header or main 10 to which the gas to be heated is supplied. The coils are also connected to the upper collecting main or header 11 through which the heated gas is discharged.

The upper ends of each tube 9 are bent 90° and enter the collecting header 11 in a horizontal direction, the purpose being to afford a yielding or flexible connection. Each tube 9 is formed with a reverse bend at its lower end, the purpose being to afford flexibility and thus minimize the development of local stresses between each coil and the supply header 10.

The various coils are sustained at their upper ends by means of the supporting plate 13 through which the upper terminal portions of the straight runs of the tubes pass, and in which they are fixed, as hereinafter described.

The plate 13 comprises a fire-resistant structural element, preferably of chrome-nickel steel, a material which has sufficient mechanical strength under the temperature conditions encountered. The supporting plate 13 is flexibly suspended by means of vertical tie rods 14 from an outer sustaining frame.

This frame comprises two beams 16 arranged at right angles to each other and extending radially in plan with reference to the circular furnace. They are sustained at their outer ends on columns 20, as shown. Suspended from the beams 16 is the ring 15 to which the tie rods 14 are directly connected. In this way flexibility is secured. The annular collecting header 11 is similarly supported by means of tie rods 17 which are sustained by a supporting ring 18 also attached to the beams 16.

The columns 20 are connected at their lower ends by the gussets 21 to the supporting plate 7 and are also braced by stiffening rings 22, two such rings being shown.

To sustain the plate 13 against lateral displacement a number of tie rods 23 connect the plate with the columns 20 adjacent the upper ring 22. To protect the frame structure from the heat of the furnace the space between the plate 13 and the beams 16 is filled with insulating material indicated at 33 and this insulating material encloses the discharge header and the tie rods hereinbefore described. This insulating material extends downward at the margin and laps the upper end of the insulated shell 5, 6, further affording protection to the column 20.

The gas to be heated, for example air, enters through the connection 24 which leads to the distributing header 10. From this the gas passes in parallel through the various tubular coils 9, the direction of flow being indicated by the arrows A. After passing upward through the first pass outside the baffle 2, it flows downward through the second pass and upward through the third pass, to the discharge header 11, from which it flows to the point of use through the connection 25.

The products of combustion flow, as indicated by the arrows B, that is, they flow upward, radially outward over the baffle 2, and then downward between the baffle 2 and the enclosing shell 5, 6, to the offtake 26.

From the above construction it follows that the various coils are sustained at their upper ends in the plate 13 and are free to expand downward so that they introduce no stresses in the plate 13 such as might overload the latter. The flexible connection to the header 10 avoids the development of undue stress in either the coils or the header.

Figure 3:
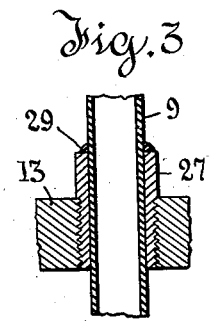
Fig. 3 is a fragmentary sectional view showing a preferred construction for connecting the tubes to the top plate.
Figure 4:
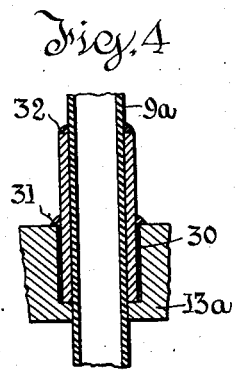
Fig. 4 is a similar view showing a modification of this feature.
Figure 2:
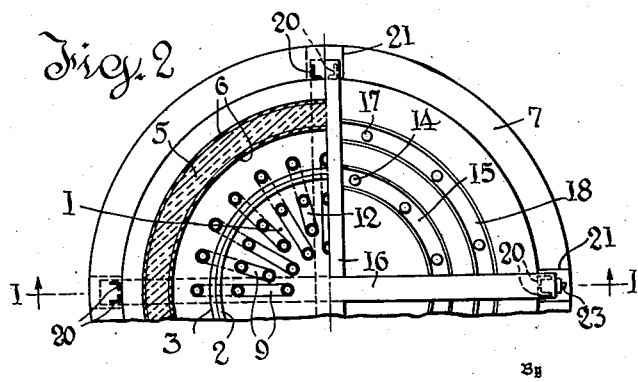
Fig. 2 is a half plan of the heater shown in Fig. 1, the left half of the view being broken away on the line 2—2 of Fig. 1 to indicate the internal construction in section.

While the coils might be mounted in various ways in the plate 13, a preferred and an alternative construction are shown in Figs. 3 and 4.

Referring first to Fig. 3 nipples 27 are shown threaded into the plate 13. These nipples after installation are connected with the tubes by welding, as indicated at 29. It will be observed that these welds are at the upper ends of the nipples and since the tubes do not make a tight fit in the nipples a limited degree of flexibility is afforded. The clearance is so small that it is impossible to show it correctly on the drawing, but it should be understood that the tubes make a rather loose fit in the nipples 27. The structure has the definite advantage that the relatively thin tube is not welded directly to the thick supporting plate 13. Such welding would cause warping of the plate and would be objectionable. The slight elasticity secured by the structure shown is a matter of substantial importance.

The alternative construction shown in Fig. 4 is similar. In this the supporting plate is indicated at 13a and one of the tubes at 9a. The plate 13a is counterbored for the insertion of a cylindrical nipple 30. This nipple is welded at its upper end, as indicated at 32, to the tube 9a. If desired it may also be spot welded at about its mid-length, as indicated at 31 to the plate 13a, but this last welding is not necessary. This connection, like that shown in Fig. 3, has the advantage of flexibility and the further advantage that the flow of heat between the tube and the supporting plate is to some extent impeded.

While I have shown a furnace of cylindrical form the specific form is subject to variation and is not a feature of the invention. The radial arrangement of the tubes, while preferred, may be departed from. Furthermore, the direction of flow of the gas through the heater might be reversed and under certain conditions it might be found desirable to reverse it.

The important feature of the invention is the heat exchanging surface, i. e., the tubes, suspended from above and carried by a sustaining structure which is wholly outside the furnace and consequently subject to relatively low temperatures. The connections of each coil with the two manifolds are flexible and the whole structure has been designed so that expansion and contraction and particularly differential expansion and contraction are permitted to occur without the development of major stress. This is attributable in part to the fact that the coils are suspended and in part to the fact that the suspension is of a flexible character.

While I have described one embodiment of the invention and prefer the one shown, this is intended to be illustrative and not limiting. Modifications within the broad scope of the invention are contemplated, as pointed out above.

What is claimed is:

1. A tubular gas heater designed for operation at high temperatures, comprising in combination, an external supporting frame; an insulating shell mounted within said frame; a heat resistant plate suspended from said frame at the upper end of said shell, said plate being formed with apertures; a plurality of tubular coils having passes connected by return bends, said coils passing through the apertures in said plate near the upper extremity of the coils, whereby the coils are sustained by the plate within said insulating shell; means for conducting gas to and from said coils; and combustion means within said shell, so arranged that the products of combustion pass in heat exchange relation with said coils.

2. The combination defined in claim 1, in which a cylindrical baffle mounted within said shell, extends between adjacent passes of the coil and directs the products of combustion in a sinuous path in contact with said coils.

3. The combination defined in claim 1 in which the fire resistant plate is suspended from the frame by tie rods flexibly connected to the frame.

4. The combination defined in claim 1 in which the fire resistant plate is suspended from the frame by tie rods flexibly connected to the frame, and heat insulating material is interposed between said fire resistant plate and said frame and encloses said tie rods.

5. The combination defined in claim 1 in which the various coils are radially arranged and in which the means for conducting gas to and from the coils comprises two manifolds each flexibly connected to the coils, one manifold being located at the lower end of said chamber and the other manifold being located above said heat resistant plate.

6. The combination defined in claim 1 in which the various coils are radially arranged and in which the means for conducting gas to and from the coils comprises two manifolds each flexibly connected to the coils, one manifold being located at the lower end of said chamber and the other manifold being located above said heat resistant plate and suspended by tie rods from said frame.

7. The combination defined in claim 1 in which the vertical passes are flexibly connected with said fire resistant plate, the connection comprising tubular nipples which encircle the tubes, project above the plate and are sustained by the plate, said nipples being welded to the tubes at points a substantial distance above the plate whereby flexible connections between the plate and the tube are afforded.

8. A tubular gas heater for obtaining high gas temperatures, comprising in combination, a central furnace and flue gas chamber, an insulating shell enclosing said chamber, a plurality of tubular coils mounted in the furnace and flue chamber, means for conducting gas to and from said coils, an external supporting frame arranged outside said insulating shell, and a heat resistant carrier plate suspended in a freely movable manner from said frame at the upper end of said shell, said coils being supported from said carrier plate and passing slidably therethrough, so that they can expand unimpeded downwards.

9. A tubular gas heater for obtaining high gas temperatures, comprising in combination, a central furnace and flue gas chamber, an insulating shell enclosing said chamber, a plurality of tubular coils mounted in the furnace and flue chamber, means for conducting gas to and from said coils, an external supporting frame arranged outside said insulating shell, and comprising beams crossing each other, a heat resistant carrier plate disposed at the upper end of said furnace and flue gas chamber, tie rods pivotally connecting said carrier plate to the beams of the supporting frame, and means affording flexible connections between the carrier plate and upper portions of said coils, so arranged that the coils are suspended and free to expand downward.

10. A tubular heater for heating gases to high temperatures, comprising a heat insulating shell enclosing the sides of a furnace chamber; a supporting structure external to and structurally independent of said shell; a heat resisting plate suspended from said supporting structure and substantially closing the upper end of said chamber; a plurality of heat transfer coils having upper portions which pass freely through said plate; means supported by the plate and connected with portions of the coils above the plate to suspend the coils from the plate with their major portions in said chamber while permitting limited lateral movement of the coils; heat insulating means above said plate; flexible inlet and discharge connections for said coils; and combustion means including means for directing products of combustion in an extended path through said chamber in heat exchanging relation with said coils.

CURT KELLER.